Oct. 8, 1929. J. CRONING Re. 17,451

CYLINDER LOCK

Original Filed July 26, 1920

INVENTOR
JOHANNES CRONING
BY Archibald Cox,
ATTORNEY

Reissued Oct. 8, 1929

Re. 17,451

UNITED STATES PATENT OFFICE

JOHANNES CRONING, OF HAMBURG, GERMANY, ASSIGNOR, BY MESNE ASSIGNMENTS, TO CROWN LOCK COMPANY, A CORPORATION OF DELAWARE

CYLINDER LOCK

Original No. 1,514,659, dated November 11, 1924, Serial No. 399,187, filed July 26, 1920, and in Germany March 22, 1919. Application for reissue filed October 29, 1926. Serial No. 145,075.

The object of the invention is to provide a lock of the cylinder type in which the greatest possible simplicity of construction in both the tumbler (or plug) cylinder and the cylindrical case is combined with a minimum of play for the key notches. With this object, the tumbler pins, which are made in one piece as usual and are housed, together with their springs, in the tumbler cylinder, are either slightly off-set or else straight, in which latter event they are provided with a projecting lateral lug to engage with the key, as is well known in connection with cylinder locks having divided tumblers.

Tumbler pins adapted to turn on their own axes must be rounded off spherically at their ends that lie at the line of intersection between the cylinder and cylinder case, in accordance with the curvature determined by the diameter of the cylinder. When the right key is used, the pairs of pins lie, when in the release position, with their contact points in the peripheral surface of the lock cylinder. The contact point of the pairs of pins may, however, lie below the peripheral surface of the lock cylinder by a distance equal to the radius of curvature of the rounded portion, since, on the cylinder being rotated, the upper tumbler pin in that case will only rise instead of lock. Since this radius of curvature is always only a few tenths of a millimetre, all keys that are within this limit and are smaller than the right key, can be used to open the lock.

To obviate this defect, the tumbler pins are prevented, by suitable means or by shaping, from turning on their own axis, so that, in the release position, their end surfaces are flush with the peripheral surface of the lock cylinder.

The drawing illustrates several methods of carrying out the subject of the invention.

Figure 1:
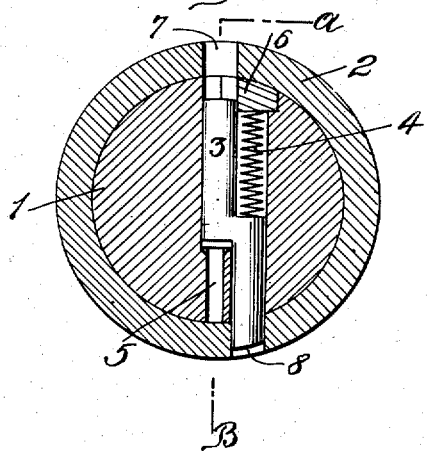
Fig. 1 is a vertical section through the lock case and the cylinder.
Figure 2:
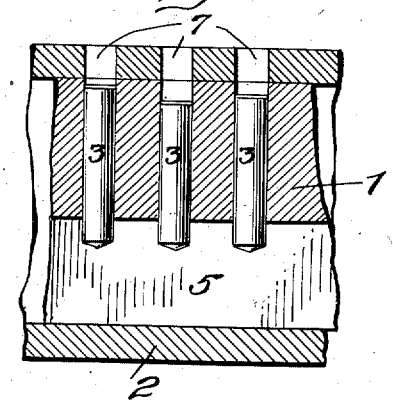
Fig. 2 is a section A—B of Fig. 1.
Figure 3:
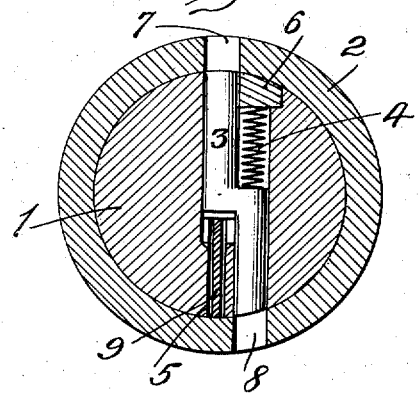
Fig. 3 shows the tumblers in the set position.

The cylinder 1 is rotatably mounted in the stationary case 2. In Figs. 1, 2 and 3, each of the tumblers consists of the off-set tumbler pins 3 and the tumbler springs 4. The tumbler pins 3 are adapted to slide axially in two parallel bores and a corresponding recess. Whereas the bore, for example the one on the right, extends entirely through the cylinder, the adjacent hole, in the extension of which the key slot 5 is situated, is not bored entirely through. The under ledge formed by the off-set of the tumbler pin 3, serves to engage with the key and to limit the downward travel of the pin 3. The upper ledge formed by the off-set serves as abutment for the tumbler spring 4. The upper abutment for the spring 4 is formed by a small plate 6, which at the same time acts as a lateral guide for the pin 3.

Figure 4:
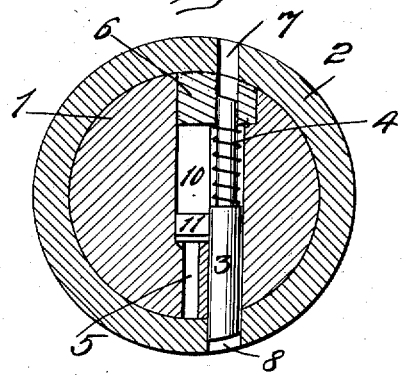
Fig. 4 illustrates a modification.

The modification in Fig. 4 has straight pins 3, the top ends of which are of reduced diameter in order to accommodate the springs 4. An off-set in the form of a lug 11, which is firmly secured to the tumbler pin 3 and is adapted to slide in the slot 10 serves to prevent the rotation of the pin and to engage with the key.

The cylindrical lock case 2 is provided with holes 7 and 8 in the line of prolongation of the cylinder bores. Since the tumbler pins 3 are prevented from turning on their axes, their free ends are flush with the peripheral surface of the cylinder when in cylinder release position (Fig. 3). This circumstance determines the total length of each tumbler pin. In the position of repose (Figs. 1, 2 and 4) the upper and lower parts of the tumbler pins 3 are of different heights. They are lifted accordingly by the key, in known manner, to bring them into the release position.

If a tumbler has not been sufficiently lifted one end will remain partly in the bore 8 of the lock case, whereas if one has been lifted too far the other end will project into the bore 7 of the lock case.

Other modifications are also possible. The essential feature of the invention consists in that the straight or lightly off-set tumbler pins are made in one piece and are housed in the tumbler cylinder exclusively, and in that, in order to reduce the play of the key notches to a minimum the tumbler pins are prevented from rotating either by shaping or by the provision of suitable means.

What I claim is:

1. A lock, comprising a stationary sleeve and a one piece rotatable cylinder therein having transverse bores registrable with perforations in said sleeve at both ends of said bores, spring-urged single-piece straight pins in said bores having an off-set for engagement by a key and capable of entering said perforations and a retaining plate in said cylinder for retaining said pins therein.

2. A lock comprising a stationary sleeve and a rotatable cylinder therein having transverse bores registrable at both ends with perforations in said sleeve, spring-urged straight one-piece pins in said bores having integral lateral lugs thereon forming off-sets for the engagement of a key and capable of entering the perforations and a plate in said cylinder for retaining said spring-urged pins.

3. A lock comprising a stationary casing having perforations therethrough on opposite sides of a diameter, a rotatable one-piece cylinder in said casing having bores, single piece tumbler pins mounted in said bores, a compression spring for each tumbler, a plate mounted in said cylinder common to said springs to hold the springs and tumblers in the cylinder and a key engaging off-set on each tumbler whereby said tumblers normally engage in one set of perforations on one side of the diameter and engage another set of casing perforations on the opposite side of said diameter when an improper key is used, said tumbler pins with their off-sets being freely inserted in said cylinder when said plate is removed.

4. A lock comprising a stationary casing having perforations therethrough on opposite sides of a diameter, a rotatable cylinder in said casing having straight bores therethrough, a tumbler pin in each bore having a reduced end, a spring on such reduced end, a plate in the cylinder holding said springs and through which said reduced ends pass to engage perforations in the cylinder, the opposite ends of said tumblers being arranged also to engage perforations in the casing.

5. In a locking device, a pin-retaining member provided with parallel lines of transverse bores, the bores of one line extending part way through said member into communication with a keyway therein and being connected with adjacent bores of the other line extending through said member, tumbler pins having a portion in one bore and an integral portion extending laterally therefrom into the connected adjacent bore, springs in one line of bores bearing upon a portion of the tumbler pins, and means, carried by said member, closing one line of bores against egress of the springs therefrom.

6. In a locking device, a pin-retaining member provided with parallel lines of transverse bores, the bores of one line being connected with adjacent bores of the other line, tumbler pins having a portion in one bore and an integral portion extending laterally therefrom into the connected adjacent bore, and means carried by the member closing one line of bores against egress of the tumbler pin therefrom.

7. In a locking device, a pin-retaining member having a pair of parallel connected transverse bores, one extending part way through said member into communication with a keyway and the other extending through said member, a tumbler pin having a portion in one bore and an integral portion extending laterally into the other bore, and means carried by said member closing an end of said bores on the side of said member opposite the side carrying the keyway against egress of the tumbler pin therefrom.

8. In a locking device, a pin-retaining member having a pair of parallel connected bores, one of the four ends whereof on each opposite side of said member is open for the projection of an end of a tumbler pin therefrom and the other end portions whereof are closed against projection of the tumbler pin therefrom, in combination with a one-piece tumbler pin having a portion in one of said bores and an integral portion extending laterally into the connected bore.

9. A locking device comprising a member carrying tumbler pins and itself independently retaining said pins assembled therein, said member comprising a pair of connected bores with a tumbler pin having a portion in one bore and an integral portion extending laterally into the connected bore, an end of one bore being provided with an obstruction preventing the separation of the tumbler pin from said member, a spring bearing upon a portion of the tumbler pin to force a projecting end thereof beyond the surface of said member, and a keyway connected with a portion of such tumbler pin to permit contact therewith by the proper key to move the tumbler pin wholly within said member, in combination with another member provided with means contacting with a side of a projecting end of said tumbler pin to obstruct a relative movement of said members.

10. A lock comprising a stationary sleeve and a one-piece rotatable cylinder therein carrying tumblers and itself independently retaining said tumblers assembled therein, said cylinder having transverse apertures to receive tumblers, spring-urged tumblers in said apertures having a portion for engagement by a key and a portion projectable beyond the surface of said cylinder and means carried by said cylinder and coacting with said tumblers to prevent the tumblers leaving the cylinder when said cylinder is removed from the sleeve.

In witness whereof, I have signed this specification.

JOHANNES CRONING.